(12) United States Patent
Yeh et al.

(10) Patent No.: US 10,990,795 B2
(45) Date of Patent: Apr. 27, 2021

(54) FINGERPRINT SENSING DEVICE

(71) Applicants: Egis Technology Inc., Taipei (TW); Igistec Co., Ltd., Hsinchu County (TW)

(72) Inventors: Hsueh-Fang Yeh, Hsinchu County (TW); Ming-Yuan Cheng, Hsinchu County (TW); Chung-Yi Wang, Hsinchu County (TW); Yu-Hsuan Lin, Hsinchu County (TW)

(73) Assignees: Egis Technology Inc., Taipei (TW); Igistec Co., Ltd., Hsinchu (TW)

( * ) Notice: Subject to any disclaimer, the term of this patent is extended or adjusted under 35 U.S.C. 154(b) by 0 days.

(21) Appl. No.: 16/792,191

(22) Filed: Feb. 15, 2020

(65) Prior Publication Data

US 2020/0311372 A1 Oct. 1, 2020

Related U.S. Application Data

(60) Provisional application No. 62/823,608, filed on Mar. 25, 2019.

(30) Foreign Application Priority Data

Dec. 26, 2019 (CN) .......................... 201911364014.0

(51) Int. Cl.
*G06K 9/00* (2006.01)

(52) U.S. Cl.
CPC .................................. *G06K 9/0004* (2013.01)

(58) Field of Classification Search
CPC ..................................................... G06K 9/0004
See application file for complete search history.

(56) References Cited

U.S. PATENT DOCUMENTS

| 9,811,711 | B2 | 11/2017 | Huang et al. | |
| 10,339,359 | B2* | 7/2019 | Zhang | G06K 9/2027 |
| 10,467,452 | B2* | 11/2019 | Li | G02F 1/13338 |
| 10,572,710 | B2* | 2/2020 | Du | G06K 9/00912 |
| 10,643,049 | B2* | 5/2020 | Ban | G06K 9/00087 |
| 10,664,676 | B2* | 5/2020 | Mackey | G02F 1/13338 |
| 10,685,206 | B2* | 6/2020 | Hu | G02B 1/005 |
| 2006/0145976 | A1* | 7/2006 | Tsai | G09G 3/36 345/87 |
| 2016/0266695 | A1* | 9/2016 | Bae | G06F 3/04166 |

(Continued)

FOREIGN PATENT DOCUMENTS

| CN | 106873284 | 6/2017 |
| TW | I319496 | 1/2010 |
| TW | I596402 | 8/2017 |

*Primary Examiner* — Utpal D Shah

(74) *Attorney, Agent, or Firm* — JCIPRNET

(57) ABSTRACT

The disclosure provides a fingerprint sensing device, including a glass cover plate, a display panel, a fingerprint sensing module, a liquid crystal layer module, and a control circuit. The display panel is disposed below the glass cover plate, and provides illumination light to a finger. The fingerprint sensing module is disposed below the glass cover plate, and senses light reflected by the finger. The liquid crystal layer module is disposed on the fingerprint sensing module. The control circuit is coupled to the liquid crystal layer module, and drives the liquid crystal layer module to focus the illumination light to the finger or focus the light reflected by the finger to the fingerprint sensing module.

8 Claims, 6 Drawing Sheets

50

(56) References Cited

U.S. PATENT DOCUMENTS

| | | | |
|---|---|---|---|
| 2017/0124372 A1* | 5/2017 | Evans, V | G06F 3/0412 |
| 2017/0176809 A1 | 6/2017 | Mao et al. | |
| 2018/0012069 A1* | 1/2018 | Chung | G06K 9/2036 |
| 2019/0294851 A1* | 9/2019 | Chung | H01L 51/5281 |
| 2020/0019749 A1* | 1/2020 | He | G06K 9/0004 |
| 2020/0293738 A1* | 9/2020 | Zhang | G06K 9/2036 |
| 2020/0349334 A1* | 11/2020 | Li | G02F 1/13338 |

* cited by examiner

| When a control circuit provides a first driving voltage to an electrode configured to drive a liquid crystal layer module, the liquid crystal layer module focuses illumination light or light reflected by a finger according to a first refractive index, so that a fingerprint sensing module obtains a first fingerprint image | — S901 |

| When the control circuit provides a second driving voltage to the electrode configured to drive the liquid crystal layer module, the liquid crystal layer module focuses the illumination light or the light reflected by the finger according to a second refractive index, so that the fingerprint sensing module obtains a second fingerprint image | — S902 |

| Perform image recognition according to the first fingerprint image and the second fingerprint image | — S903 |

FIG. 9

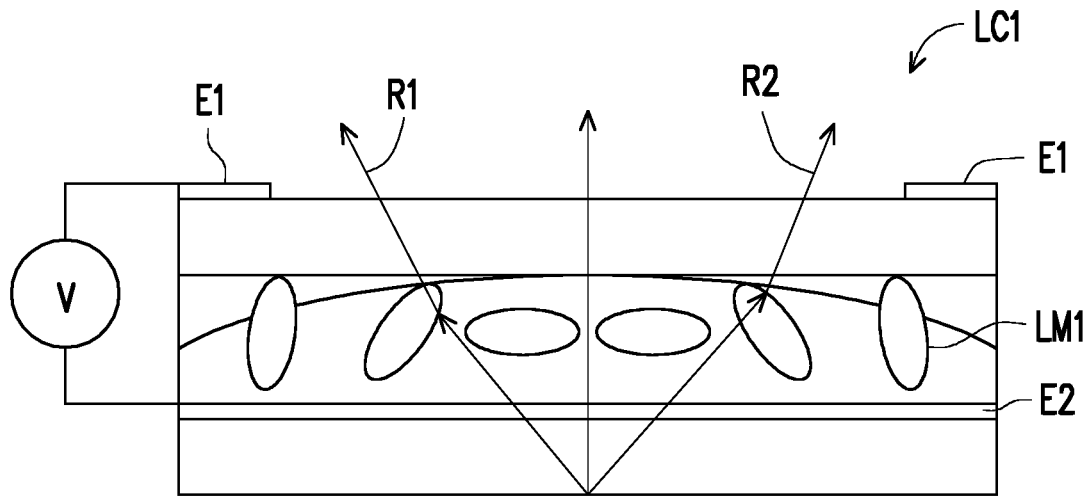

FIG. 10

FINGERPRINT SENSING DEVICE

CROSS-REFERENCE TO RELATED APPLICATION

This application claims the priority benefits of U.S. provisional application Ser. No. 62/823,608, filed on Mar. 25, 2019, and China application serial no. 201911364014.0, filed on Dec. 26, 2019. The entirety of each of the above-mentioned patent applications is hereby incorporated by reference herein and made a part of this specification.

BACKGROUND

Technical Field

The disclosure relates to a fingerprint sensing technology, and in particular, to a fingerprint sensing device.

Description of Related Art

At present, the fingerprint recognition technology has been widely applied, solely or jointly, to various electronic devices or products, and various fingerprint recognition technologies, including at least the capacitive fingerprint recognition technology, the optical fingerprint recognition technology, and the ultrasonic fingerprint recognition technology, are being continuously developed and refined. Among these technologies, the optical fingerprint recognition technology has a wider sensing range and lower cost. Therefore, the under-screen optical fingerprint recognition technology in which a fingerprint sensing module is disposed below a touch panel is receiving more and more attention. Moreover, in the future, the embedded optical fingerprint recognition technology in which a fingerprint sensing module is disposed inside a touch panel is also expected to be released and applied. The principle of the optical fingerprint recognition technology is briefly described as follows. A fingerprint of a finger includes a plurality of irregular peaks and troughs. When a beam is irradiated on the peaks and troughs of the fingerprint, the beam is diffused onto a light receiving surface of an image capture assembly to form a pattern with alternate light and dark portions. Finally, the corresponding image information is calculated by using an algorithm, and thereby the fingerprint is recognized.

However, in the foregoing optical fingerprint sensing device, if the range of the angle at which the illumination beam that can be transmitted to the finger is incident is too wide, the fingerprint image that is obtained will be blurred and unclear. That is, in a case where the under-screen optical fingerprint recognition technology is applied, the fingerprint image generated by the image capture assembly may be relatively blurred in correspondence with a wider visible range provided by the display panel. On the other hand, if the range of the angle at which the fingerprint image beam that can be transmitted to the image capture assembly is incident is too wide, the fingerprint image that is obtained will also be blurred and unclear.

SUMMARY

In view of this, the disclosure provides a fingerprint sensing device, capable of making the fingerprint image clearer to facilitate fingerprint recognition performance.

Embodiments of the disclosure provide a fingerprint sensing device, including a glass cover plate, a display panel, a fingerprint sensing module, a liquid crystal layer module, and a control circuit. The display panel is disposed below the glass cover plate, and provides illumination light to a finger. The fingerprint sensing module is disposed below the glass cover plate, and senses light reflected by the finger. The liquid crystal layer module is disposed on the fingerprint sensing module. The control circuit is coupled to the liquid crystal layer module, and drives the liquid crystal layer module to focus the illumination light to the finger or focus the light reflected by the finger to the fingerprint sensing module.

Based on the above, in the embodiments of the disclosure, the liquid crystal layer module may be driven to focus the illumination light to the finger or focus the light reflected by the finger to the fingerprint sensing module, to suppress the interference of the diffused light and thereby make the finger print image clearer. In this way, the embodiments of the disclosure is capable of making the fingerprint image clearer to thereby facilitate the fingerprint recognition performance.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the disclosure, and are incorporated in and constitute a part of this specification. The accompanying drawings illustrate embodiments of the disclosure and, together with the description, serve to explain the principles of the disclosure.

FIG. 9 is a flowchart of a fingerprint recognition method according to an embodiment of the disclosure.

FIG. 10 is a schematic diagram of an example of a liquid crystal layer module focusing light according to an embodiment of the disclosure.

DESCRIPTION OF THE EMBODIMENTS

Figure 1:
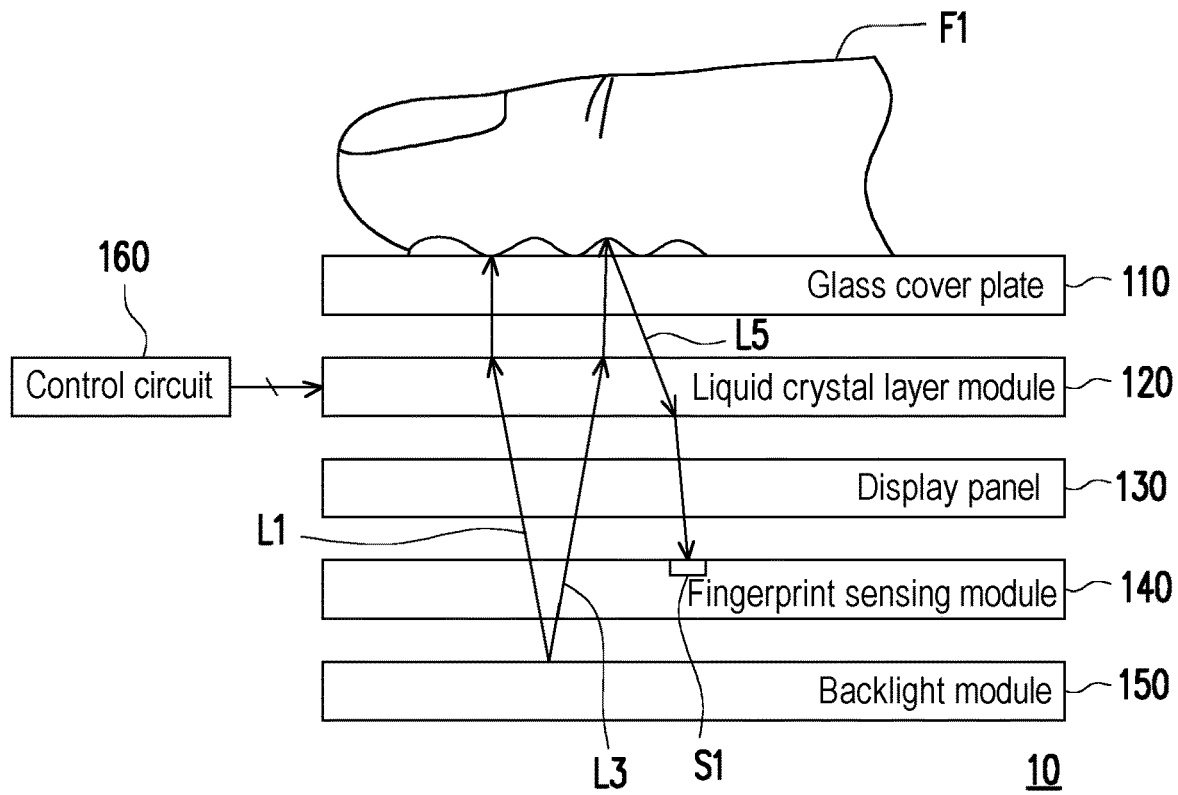
FIG. 1 is a schematic diagram of a fingerprint sensing device according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

It should be understood that when a component such as a layer, film, region or substrate is referred to as being "on" or "connected" to another component, it may be directly on or connected to the another component, or intervening components may also be present. In contrast, when a component is referred to as being "directly on" or "directly connected to" another component, there are no intervening components present. As used herein, "connection" may refer to a physical and/or electrical connection. Furthermore, "electrical connection" or "coupling" may mean that there is another component between two components.

The embodiments of the disclosure provide a fingerprint sensing device, including a glass cover plate, a display panel, a fingerprint sensing module, a liquid crystal layer module, and a control circuit. The fingerprint sensing device may be implemented as a smart phone, a panel, a game machine, or another electronic device with an optical under-screen fingerprint recognition function, which is not limited in the disclosure.

The display panel is disposed below the glass cover plate, and provides illumination light to a finger. The display panel may be implemented as an organic light-emitting diode (OLED) display panel, an active matrix organic light emitting diodes (AMOLED) display panel, or a liquid crystal display (LCD) display panel, which is not limited in the disclosure.

Specifically, in the embodiments of the disclosure, the display panel may include a pixel array substrate, an opposite substrate relative to the pixel array substrate, and a display medium disposed between the pixel array substrate and the opposite substrate. When the display medium is a non-self-luminous display medium (for example, a liquid crystal), the display panel needs a backlight module to provide a light source. When the display medium is a self-luminous display medium (for example, an OLED), the display panel does not need a backlight module to provide a light source.

The fingerprint sensing module is disposed below the glass cover plate and includes at least one optical fingerprint sensor which may be implemented as a charge-coupled device (CCD) sensor or a complementary metal-oxide-semiconductor (CMOS) sensor, which is not limited in the disclosure. When a finger touches the glass cover plate, the fingerprint sensing module may sense light reflected by the finger.

In the embodiments of the disclosure, the liquid crystal layer module may be disposed on or below the fingerprint sensing module, and includes a liquid crystal material and at least one layer of electrode. The control circuit is coupled to the liquid crystal layer module, and is configured to provide a driving voltage to the electrode in the liquid crystal layer module. By applying the driving voltage to the electrode, a twist angle of liquid crystal molecules in the liquid crystal layer module may be controlled. Therefore, it can be seen that, by appropriately configuring the pattern and position of the electrode, the liquid crystal layer module may be implemented as a refractive-index-adjustable liquid crystal lens, and a refractive index of the refractive-index-adjustable liquid crystal lens depends on the driving voltage. The liquid crystal layer module may refract an incident light to focus the incident light, so as to provide a light focusing function.

FIG. 10 is a schematic diagram of an example of a liquid crystal layer module focusing light according to an embodiment of the disclosure. Referring to FIG. 10, a liquid crystal layer module LC1 includes a liquid crystal material LM1 and electrodes E1 and E2. According to a voltage difference V between the electrodes E1 and E2, liquid crystal molecules in the liquid crystal material LM1 may be controlled to twist, so that an incident light (for example, beams R1 and R2) generated by a light source (for example, a light-emitting pixel unit of an OLED panel or a backlight module of a LCD panel) is refracted to provide a light focusing function. However, FIG. 10 is only an example used for describing that the liquid crystal layer module LC1 has the light focusing function, and configurations of the electrode and the voltage difference V may be determined according to an actual application.

In the embodiments of the disclosure, based on different configuration positions of the liquid crystal layer module, the liquid crystal layer module may be driven to focus the illumination light to the finger and/or focus the light reflected by the finger to the fingerprint sensing module. Because the liquid crystal layer module may be configured to focus the illumination light that illuminates the finger, an incident angle range of the illumination light transmitted to the finger is reduced. In this way, the interference of stray lights sensed by photosensitive positions on the fingerprint sensing module is reduced, so that the contrast of a fingerprint image is improved. In addition, because the liquid crystal layer module may be configured to focus the light reflected by the finger, an incident angle range of the light reflected by the finger that is transmitted to the fingerprint sensing module is reduced, so that the fingerprint sensing module can obtain a clearer fingerprint image.

The following lists embodiments of the liquid crystal layer module with different configurations and different types of display panels to describe the disclosure.

FIG. 1 is a schematic diagram of a fingerprint sensing device according to an embodiment of the disclosure. Referring to FIG. 1, a fingerprint sensing device 10 includes a glass cover plate 110, a liquid crystal layer module 120, a display panel 130, a fingerprint sensing module 140, a backlight module 150 of the display panel 130, and a control circuit 160. The backlight module 150 of the display panel 130 is configured to provide illumination light to a finger F1, and the fingerprint sensing module 140 senses light reflected by the finger F1.

In the embodiment of FIG. 1, the liquid crystal layer module 120 is disposed on the display panel 130 and below the glass cover plate 110, and the fingerprint sensing module 140 is disposed between the display panel 130 and the backlight module 150 and includes at least one fingerprint sensor S1. In this configuration, the control circuit 160 may drive the liquid crystal layer module 120 to focus the illumination light to the finger F1 and focus the light reflected by the finger F1 to the fingerprint sensing module 140. Specifically, beams L1 and L3 (that is, the illumination light) provided by the backlight module 150 may be focused after being refracted by the liquid crystal layer module 120, and then is transmitted to a fingerprint surface of the finger F1. A beam L5 (that is, the light reflected by the finger F1) generated by the finger F1 reflecting the beam L3 may be focused after being refracted by the liquid crystal layer module 120, and then is transmitted to a sensing surface of the fingerprint sensing module 140. Because the liquid crystal layer module 120 has the light focusing function, an incident angle range of an illumination beam transmitted to the finger F1 is reduced, and an incident angle range of a fingerprint image beam transmitted to the fingerprint sensing module 140 is also reduced. Therefore, the contrast of a fingerprint image generated by the fingerprint sensing module 140 can be improved.

However, it should be noted that, in the embodiment in which the liquid crystal layer module is disposed on the display panel, the fingerprint sensing module is not limited to being disposed below the display panel as shown in FIG. 1. In another embodiment, the fingerprint sensing module may be disposed next to the display panel, but the coverage of the liquid crystal layer module covers the display panel and the fingerprint sensing module. In this configuration, the liquid crystal layer module may also be driven to focus the illumination light to the finger and focus the light reflected by the finger to the fingerprint sensing module.

Figure 2:
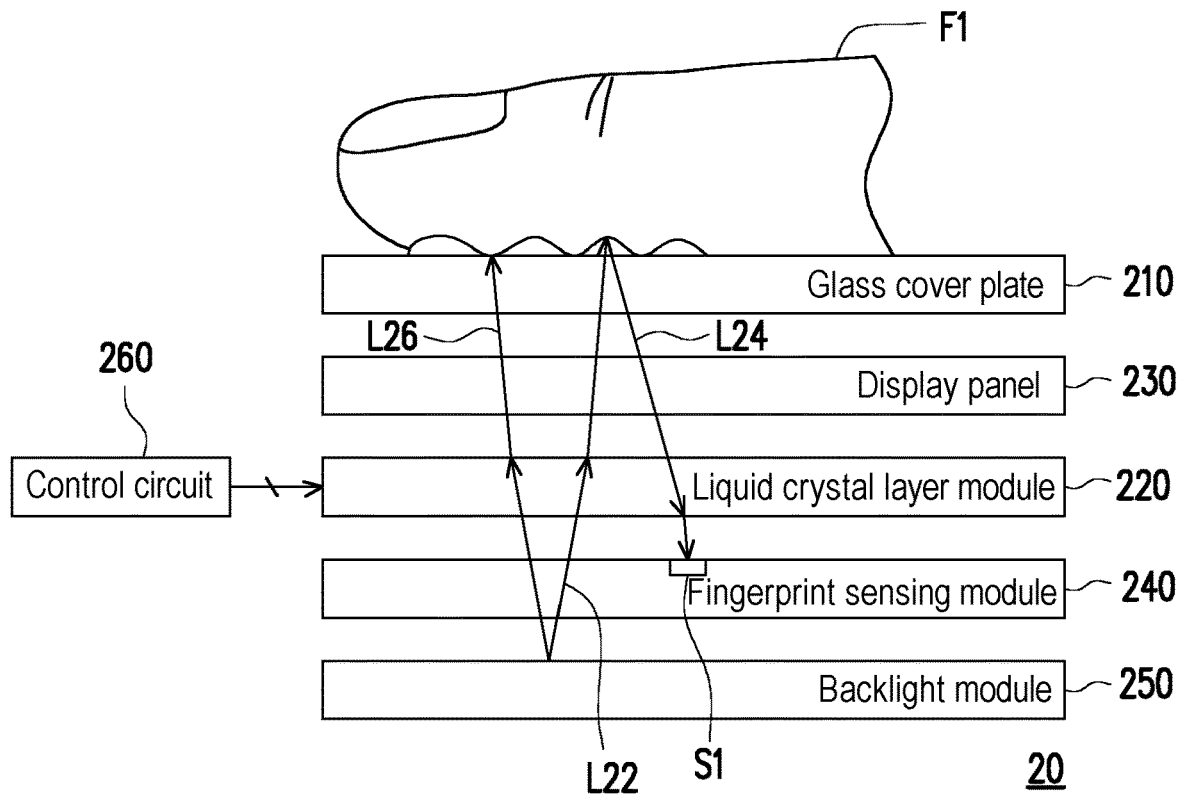
FIG. 2 is a schematic diagram of a fingerprint sensing device according to an embodiment of the disclosure.

FIG. 2 is a schematic diagram of a fingerprint sensing device according to an embodiment of the disclosure. Referring to FIG. 2, a liquid crystal layer module 220 is disposed below a display panel 230 and a glass cover plate 210, and a fingerprint sensing module 240 is disposed between the liquid crystal layer module 220 and a backlight module 250 and includes at least one fingerprint sensor S1. A difference between the embodiment of FIG. 2 and the embodiment of FIG. 1 is that, the liquid crystal layer module 220 is disposed below the display panel 230, and is disposed between the display panel 230 and the backlight module 250 of the display panel 230. In this configuration, a control circuit 260 may drive the liquid crystal layer module 220 to focus illumination light to a finger F1 and focus light reflected by the finger F1 to the fingerprint sensing module 240. Specifically, beams L26 and L22 (that is, the illumination light) provided by the backlight module 250 may be focused after being refracted by the liquid crystal layer module 220, and then is transmitted to a fingerprint surface of the finger F1. A beam L24 (that is, the light reflected by the finger F1) generated by the finger F1 reflecting the beam L22 may be focused after being refracted by the liquid crystal layer module 120, and then is transmitted to a sensing surface of the fingerprint sensing module 240. Because the liquid crystal layer module 220 has the light focusing function, an incident angle range of an illumination beam transmitted to the finger F1 is reduced, and an incident angle range of a fingerprint image beam transmitted to the fingerprint sensing module 240 is also reduced. Therefore, the contrast of a fingerprint image generated by the fingerprint sensing module 240 can be improved.

Figure 3:
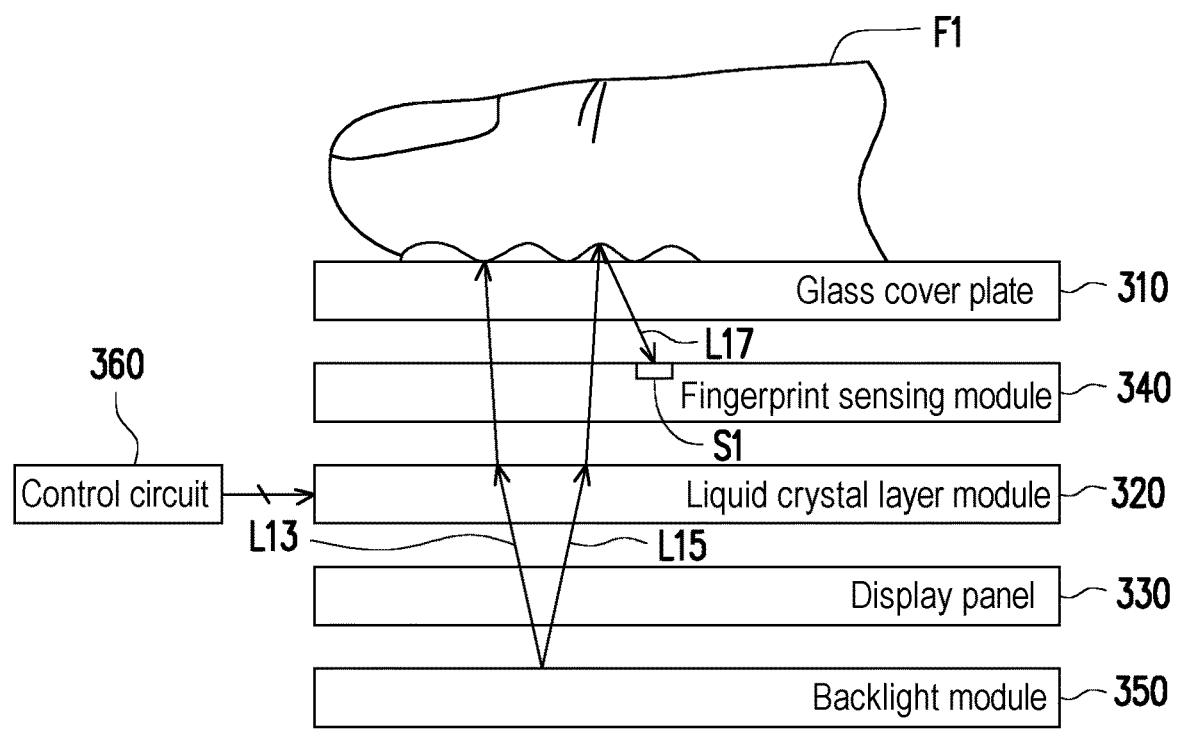
FIG. 3 is a schematic diagram of a fingerprint sensing device according to an embodiment of the disclosure.

FIG. 3 is a schematic diagram of a fingerprint sensing device according to an embodiment of the disclosure. Referring to FIG. 3, a liquid crystal layer module 320 is disposed between a fingerprint sensing module 340 and a display panel 330. In this configuration, a control circuit 360 may drive the liquid crystal layer module 320 to focus illumination light to a finger F1. Specifically, beams L13 and L15 (that is, the illumination light) provided by a backlight module 350 may be focused after being refracted by the liquid crystal layer module 320, and then is transmitted to a fingerprint surface of the finger F1. A beam L17 (that is, the light reflected by the finger F1) generated by the finger F1 reflecting the beam L15 may be transmitted to a sensing surface of the fingerprint sensing module 340 located below a glass cover plate 310. Because the liquid crystal layer module 320 has the light focusing function, an incident angle range of an illumination beam transmitted to the finger F1 is reduced. Therefore, the contrast of a fingerprint image generated by the fingerprint sensing module 340 can be improved.

In the embodiments of FIG. 1 to FIG. 3, the display medium of the display panel is a non-self-luminous display medium, so that the backlight module is needed to provide a light source for display. The following lists embodiments in which the display medium of the display panel is a self-luminous display medium.

Figure 4:
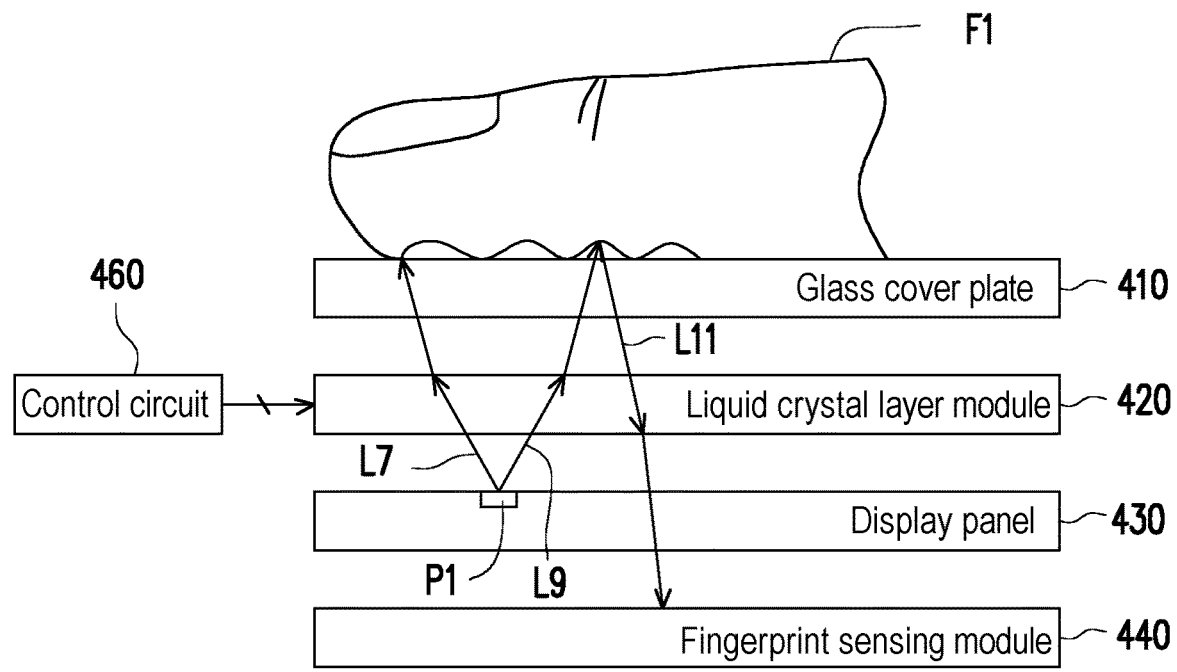
FIG. 4 is a schematic diagram of a fingerprint sensing device according to an embodiment of the disclosure.

FIG. 4 is a schematic diagram of a fingerprint sensing device according to an embodiment of the disclosure. Referring to FIG. 4, a liquid crystal layer module 420 is disposed on a display panel 430. The display panel 430 includes a plurality of self-luminous pixel units (for example, self-luminous pixel units P1), and the self-luminous pixel units provide illumination light that illuminates a finger F1. In this configuration, a control circuit 460 may drive the liquid crystal layer module 420 to focus the illumination light to the finger F1 and focus light reflected by the finger F1 to a fingerprint sensing module 440. Specifically, beams L7 and L9 (that is, the illumination light) provided by the self-luminous pixel units P1 may be focused after being refracted by the liquid crystal layer module 420, and then is transmitted to a fingerprint surface of the finger F1. A beam L11 (that is, the light reflected by the finger F1) generated by the finger F1 reflecting the beam L9 may be focused after being refracted by the liquid crystal layer module 420, and then is transmitted to a sensing surface of the fingerprint sensing module 440. Because the liquid crystal layer module 420 has the light focusing function, an incident angle range of an illumination beam transmitted to the finger F1 is reduced, and an incident angle range of a fingerprint image beam transmitted to the fingerprint sensing module 440 is also reduced. Therefore, the contrast of a fingerprint image generated by the fingerprint sensing module 440 can be improved.

Figure 5:
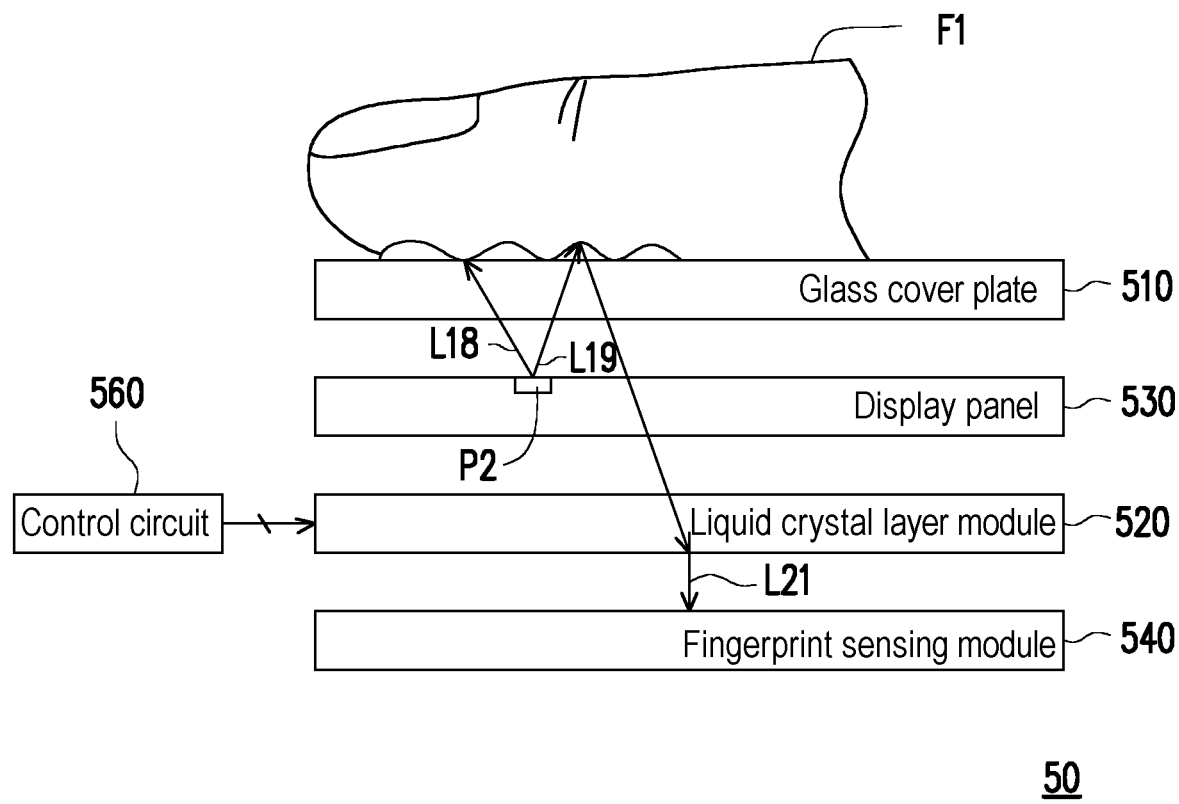
FIG. 5 is a schematic diagram of a fingerprint sensing device according to an embodiment of the disclosure.

FIG. 5 is a schematic diagram of a fingerprint sensing device according to an embodiment of the disclosure. Referring to FIG. 5, a liquid crystal layer module 520 is disposed below a display panel 530. The display panel 530 includes a plurality of self-luminous pixel units (for example, self-luminous pixel units P2), and the self-luminous pixel units provide illumination light that illuminates the finger F1. In this configuration, a control circuit 560 may drive the liquid crystal layer module 520 to focus light reflected by the finger F1 to a fingerprint sensing module 540. Specifically, beams L18 and L19 (that is, the illumination light) provided by the self-luminous pixel units P2 may penetrate a glass cover plate 510 and then is transmitted to a fingerprint surface of the finger F1. A beam L21 (that is, the light reflected by the finger F1) generated by the finger F1 reflecting the beam L19 may be focused after being refracted by the liquid crystal layer module 520, and then is transmitted to a sensing surface of the fingerprint sensing module 540. Because the liquid crystal layer module 520 has the light focusing function, an incident angle range of a fingerprint image beam transmitted to the fingerprint sensing module 540 is reduced. Therefore, the contrast of a fingerprint image generated by the fingerprint sensing module 540 can be improved.

In the embodiments of FIG. 1 to FIG. 5, the fingerprint sensing module, the liquid crystal layer module, and the display panel may be bonded by an adhesive layer, and a material of the adhesive layer may be, for example, an optical clear adhesive (OCA) with high transmittance, which is not limited in the disclosure. In addition, it should be noted that, FIG. 1 to FIG. 5 are drawn to describe how the liquid crystal layer module adjusts optical paths of the illumination light and the light that is reflected by the finger F1, so that only the impact of the liquid crystal layer module on the optical paths is illustrated. However, other components and structures in the fingerprint sensing device may also affect the optical paths, and this is omitted in the disclosure for a clear description.

Figure 6:
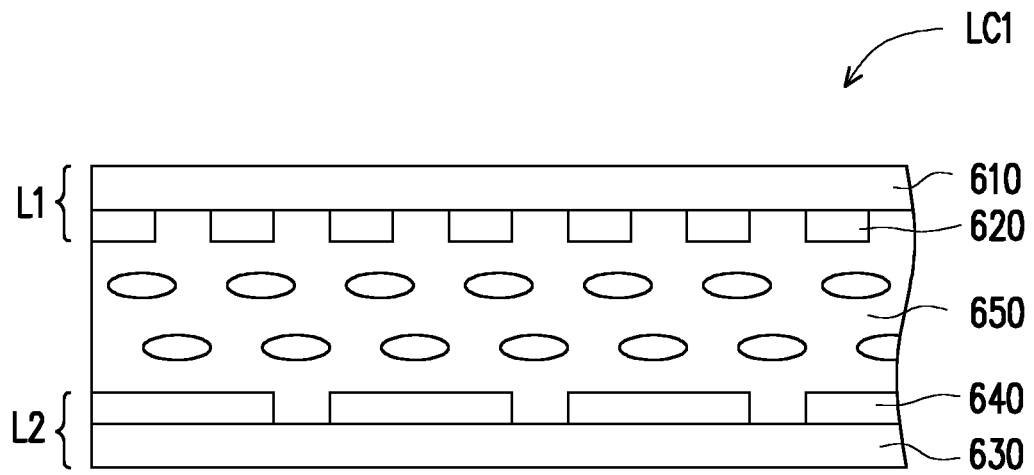
FIG. 6 is a schematic diagram of a liquid crystal layer module according to an embodiment of the disclosure.

FIG. 6 is a schematic diagram of a liquid crystal layer module according to an embodiment of the disclosure. Referring to FIG. 6, a liquid crystal layer module LC1 may include a liquid crystal layer 650, an upper electrode layer L1, and a lower electrode layer L2. The liquid crystal layer 650 includes a liquid crystal medium and is disposed between the upper electrode layer L1 and the lower electrode layer L2. The upper electrode layer L1 includes a substrate 610 and a plurality of upper electrodes (for example, upper electrodes 620) disposed on the substrate 610. The lower electrode layer L2 includes a substrate 630 and a plurality of lower electrodes (for example, lower electrodes 640) disposed on the substrate 630. A control circuit may provide a driving voltage to the upper electrodes and the lower electrodes, to drive the liquid crystal layer 650. That is, an electric field formed by the upper electrodes and the lower electrodes may drive the liquid crystal of the liquid crystal layer 650 to rotate to provide the light focusing function. In this embodiment, four upper electrodes may be disposed on four corners of one lower electrode, and there are gaps between the four upper electrodes to allow lights to pass through. Therefore, it can be seen that, by controlling the driving voltage applied to the upper electrodes and the lower electrodes, the liquid crystal layer 650 is driven to switch between a non-lens state and a lens state, and a refractive index in the lens state may also be adjusted by adjusting a rotation angle of the liquid crystal.

Figure 7:
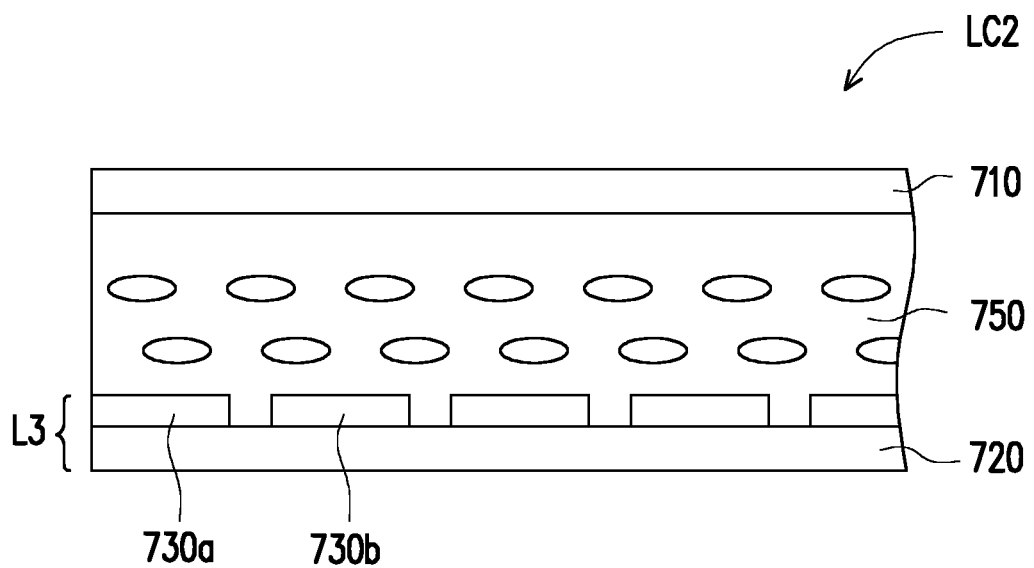
FIG. 7 is a schematic diagram of a liquid crystal layer module according to an embodiment of the disclosure.

FIG. 7 is a schematic diagram of a liquid crystal layer module according to an embodiment of the disclosure. Referring to FIG. 7, a liquid crystal layer module LC2 may include a substrate 710, a liquid crystal layer 750, and an electrode layer L3. The liquid crystal layer 750 includes a liquid crystal medium and is disposed on the electrode layer L3. The electrode layer L3 includes a substrate 720 and a plurality of electrodes (for example, electrodes 730a and 730b) disposed on the substrate 720. A control circuit may provide a driving voltage to the plurality of electrodes of the electrode layer L3, to drive the liquid crystal layer 750. That is, an electric field formed by the electrodes may drive the liquid crystal of the liquid crystal layer 750 to rotate to provide the light focusing function. Therefore, it can be seen that, by controlling the driving voltage applied to at least two electrodes, the at least two electrodes may be configured to drive the liquid crystal layer 750 to switch between a non-lens state and a lens state, and a refractive index in the lens state may also be adjusted.

Figure 8A:
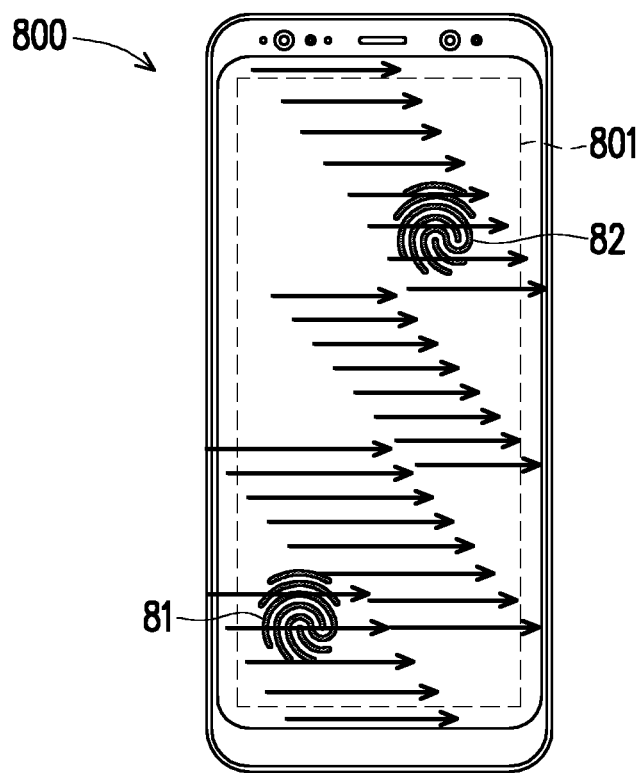
FIG. 8A is a schematic diagram of a fingerprint sensing device according to an embodiment of the disclosure.
Figure 8B:
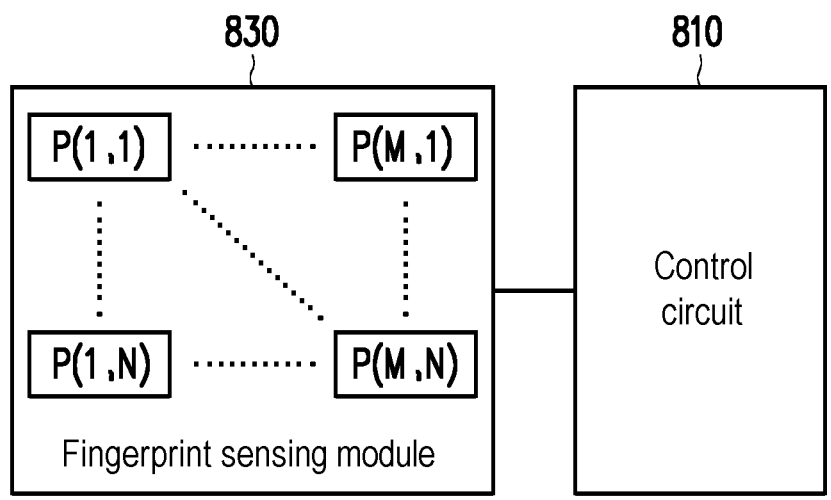
FIG. 8B is a schematic diagram of a plurality of fingerprint sensors according to an embodiment of the disclosure.

FIG. 8A is a schematic diagram of a fingerprint sensing device according to an embodiment of the disclosure. FIG. 8B is a schematic diagram of a plurality of fingerprint sensors according to an embodiment of the disclosure. Referring to FIG. 8A and FIG. 8B, a display panel of a fingerprint sensing device 800 includes a full-screen fingerprint sensing region 801 for a user to press a fingerprint, and a fingerprint sensing module may include a plurality of fingerprint sensors arranged in an array. In this embodiment, the fingerprint sensing module may capture full-screen fingerprint images including fingerprints 81 and 82 located in the fingerprint sensing region 801. A fingerprint sensing module 830 includes a plurality of optical fingerprint sensors arranged in an array, P(1, 1), . . . , P(M, 1), . . . , P(1, N), . . . , P(M, N), where M and N may be any integer determined according to design requirements. A processing circuit 810 may include circuits such as a processor of the fingerprint sensing device 800, a control circuit that drives a liquid crystal layer module, a driving circuit that controls a fingerprint sensing group, and a display panel driving circuit. Each of the optical fingerprint sensors P(1, 1) to P(M, N) includes a photodiode configured for photoelectric conversion. In the embodiments of FIG. 8A and FIG. 8B, an area of the fingerprint sensing region 801 formed by the fingerprint sensors P(1, 1) to P(M, N) is approximately equal to a display region of the display panel, and a layout region of the liquid crystal layer module is at least equal to the display region of the display panel. That is, the layout region of the liquid crystal layer module overlaps the display region of the display panel. In addition, the processing circuit 810 may perform fingerprint recognition according to a fingerprint image generated by the fingerprint sensing module 830.

In an embodiment, the foregoing liquid crystal layer module may be configured to form a plurality of lens elements, and refractive indexes of the lens elements may be adjusted by adjusting the driving voltage. The refractive index of a portion of the lens elements is different from the refractive index of another portion of the lens elements. Specifically, the liquid crystal layer module may be regarded as including a plurality of liquid crystal lens elements, and refractive indexes of the liquid crystal lens elements may be configured to provide the light focusing function. In an embodiment, the fingerprint sensing device may first detect a touch position of the finger, and then drives a local liquid crystal in the liquid crystal layer module according to the touch position to provide the light focusing function. In other words, the control circuit may drive a local electrode of the liquid crystal layer module to achieve the purpose of local control. If FIG. 8B is used as an example, the control circuit may drive the liquid crystal on a portion of the optical fingerprint sensors P(1, 1) to P(M, N) to provide the light focusing function, and make the liquid crystal on another portion of the optical fingerprint sensors P(1, 1) to P(M, N) not provide the light focusing function.

FIG. 9 is a flowchart of a fingerprint recognition method according to an embodiment of the disclosure. Referring to FIG. 9, in step S901, when a control circuit provides a first driving voltage to an electrode configured to drive a liquid crystal layer module, the liquid crystal layer module focuses illumination light or light reflected by a finger according to a first refractive index, so that a fingerprint sensing module obtains a first fingerprint image. In step S902, when the control circuit provides a second driving voltage to the electrode configured to drive the liquid crystal layer module, the liquid crystal layer module focuses the illumination light or the light reflected by the finger according to a second refractive index, so that the fingerprint sensing module obtains a second fingerprint image. In step S903, image recognition is performed according to the first fingerprint image and the second fingerprint image. Therefore, more fingerprint image information is obtained, and a better fingerprint recognition effect is obtained.

In detail, the control circuit may control the refractive index of the liquid crystal layer module by controlling the driving voltage applied to the electrode of the liquid crystal layer module. In an embodiment, when the liquid crystal layer module provides the light focusing function at the first refractive index, the fingerprint sensing module may obtain the first fingerprint image corresponding to the first refractive index. Then, when the liquid crystal layer module provides the light focusing function at the second refractive index, the fingerprint sensing module may obtain the second fingerprint image corresponding to the second refractive index. The fingerprint sensing device may obtain the first fingerprint image and the second fingerprint image corresponding to different refractive indexes, so as to obtain more fingerprint image information. In this way, the fingerprint sensing device can perform image processing on the first fingerprint image and the second fingerprint image to obtain a better fingerprint recognition effect.

It is worth mentioning that, in the embodiments of the disclosure, the liquid crystal layer module not only can be used for improving the fingerprint recognition performance, but also can be used for dynamically adjusting a visible range of the display panel to prevent others from peeping. In detail, by controlling the rotation angle of the liquid crystal material of the liquid crystal layer module, the liquid crystal layer module can shield light, sent beyond a specific visible range, of the backlight module or the self-luminous display panel, so that the display panel can have different visible ranges. For example, by controlling the rotation angle of an inner liquid crystal material of the liquid crystal layer module, the fingerprint sensing device having a display function in the embodiments of the disclosure can provide a wide viewing angle mode or a narrow viewing angle mode. When a user is watching confidential content, by controlling the rotation angle of the liquid crystal material of the liquid crystal layer module, the fingerprint sensing device can be operated in the narrow viewing angle mode, to prevent others from peeping. When the user is watching non-confidential content, by controlling the rotation angle of the liquid crystal material of the liquid crystal layer module, the fingerprint sensing device can be operated in the wide viewing angle mode, to provide a wide visible range. In summary, in the embodiments of the disclosure, the liquid crystal layer module can be configured to focus the illumination light that illuminates the finger, to reduce an incident angle at which the illumination light illuminates the finger, thereby suppressing the interference of the diffused light and thus making the finger print image clearer. In addition, the liquid crystal layer module can be configured to focus the light reflected by the finger, to make a difference between light energy reflected by peaks of the fingerprint and light energy reflected by troughs of the fingerprint more obvious, thereby improving the contrast of a fingerprint image. Therefore, in the embodiments of the disclosure, the fingerprint image becomes clearer to thereby facilitate the fingerprint recognition performance. In addition, in the case that the liquid crystal layer module can provide different refractive indexes, the fingerprint sensing device can perform fingerprint recognition according to fingerprint images corresponding to different refractive indexes, so as to improve the fingerprint recognition performance. Moreover, the liquid crystal layer module can be configured to shield light sent beyond a specific visible range, so as to achieve the purpose of preventing peeping.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A fingerprint sensing device, comprising:
   a glass cover plate;
   a display panel, disposed below the glass cover plate, and providing illumination light to a finger;
   a fingerprint sensing module, disposed below the glass cover plate, and sensing light reflected by the finger;
   a liquid crystal layer module, disposed on or below the fingerprint sensing module; and
   a control circuit, coupled to the liquid crystal layer module, and driving the liquid crystal layer module to focus the illumination light to the finger or focus the light reflected by the finger to the fingerprint sensing module,
   wherein the liquid crystal layer module and the fingerprint sensing module are disposed on the display panel, the liquid crystal layer module is disposed between the fingerprint sensing module and the display panel, a backlight module of the display panel provides the illumination light, and the control circuit drives the liquid crystal layer module to focus the illumination light to the finger.

2. The fingerprint sensing device according to claim 1, wherein the liquid crystal layer module comprises a liquid crystal layer, an upper electrode layer, and a lower electrode layer, the liquid crystal layer is disposed between the upper electrode layer and the lower electrode layer, and at least one upper electrode of the upper electrode layer and at least one lower electrode of the lower electrode layer are configured to drive the liquid crystal layer.

3. The fingerprint sensing device according to claim 1, wherein the liquid crystal layer module comprises a liquid crystal layer and an electrode layer, the liquid crystal layer is disposed on the electrode layer, and the electrode layer comprises at least two electrodes configured to drive the liquid crystal layer.

4. The fingerprint sensing device according to claim 1, wherein the fingerprint sensing module comprises a plurality of fingerprint sensors, an area of a fingerprint sensing region formed by the fingerprint sensors is equal to a display region of the display panel, and a layout region of the liquid crystal layer module is equal to the display region of the display panel.

5. The fingerprint sensing device according to claim 1, wherein the liquid crystal layer module is configured to form a plurality of lens elements, and a refractive index of a portion of the lens elements is different from a refractive index of another portion of the lens elements.

6. The fingerprint sensing device according to claim 1, wherein when the control circuit provides a first driving voltage to an electrode configured to drive the liquid crystal layer module, the liquid crystal layer module focuses the illumination light or the light reflected by the finger according to a first refractive index, so that the fingerprint sensing module obtains a first fingerprint image, and when the control circuit provides a second driving voltage to the electrode configured to drive the liquid crystal layer module, the liquid crystal layer module focuses the illumination light or the light reflected by the finger according to a second refractive index, so that the fingerprint sensing module obtains a second fingerprint image.

7. A fingerprint sensing device, comprising:
   a glass cover plate;
   a display panel, disposed below the glass cover plate, and providing illumination light to a finger;
   a fingerprint sensing module, disposed below the glass cover plate, and sensing light reflected by the finger;
   a liquid crystal layer module, disposed on or below the fingerprint sensing module; and
   a control circuit, coupled to the liquid crystal layer module, and driving the liquid crystal layer module to focus the illumination light to the finger or focus the light reflected by the finger to the fingerprint sensing module,
   wherein the liquid crystal layer module is disposed below the display panel, the liquid crystal layer module is disposed between the display panel and a backlight module of the display panel, the backlight module provides the illumination light, and the control circuit drives the liquid crystal layer module to focus the illumination light to the finger.

8. A fingerprint sensing device, comprising:
   a glass cover plate;
   a display panel, disposed below the glass cover plate, and providing illumination light to a finger;

a fingerprint sensing module, disposed below the glass cover plate, and sensing light reflected by the finger;

a liquid crystal layer module, disposed on or below the fingerprint sensing module; and a control circuit, coupled to the liquid crystal layer module, and driving the liquid crystal layer module to focus the illumination light to the finger or focus the light reflected by the finger to the fingerprint sensing module, wherein the liquid crystal layer module is disposed below the display panel, the display panel comprises a plurality of self-luminous pixel units, the self-luminous pixel units provide the illumination light, and the control circuit drives the liquid crystal layer module to focus the light reflected by the finger to the fingerprint sensing module.

* * * * *